US011825211B2

(12) United States Patent
Wong et al.

(10) Patent No.: US 11,825,211 B2
(45) Date of Patent: Nov. 21, 2023

(54) METHOD OF COLOR INSPECTION BY USING MONOCHROME IMAGING WITH MULTIPLE WAVELENGTHS OF LIGHT

(71) Applicant: MIT SEMICONDUCTOR PTE LTD, Singapore (SG)

(72) Inventors: Kok Weng Wong, Singapore (SG); Albert Archwamety, Singapore (SG); Jun Kang Ng, Singapore (SG); Chee Chye Lee, Singapore (SG)

(73) Assignee: MIT SEMICONDUCTOR (TIAN JIN) CO., LTD, Tianjin (CN)

( * ) Notice: Subject to any disclaimer, the term of this patent is extended or adjusted under 35 U.S.C. 154(b) by 0 days.

(21) Appl. No.: 17/439,135

(22) PCT Filed: Mar. 21, 2019

(86) PCT No.: PCT/SG2019/050151
§ 371 (c)(1),
(2) Date: Sep. 14, 2021

(87) PCT Pub. No.: WO2020/190206
PCT Pub. Date: Sep. 24, 2020

(65) Prior Publication Data
US 2022/0159182 A1     May 19, 2022

(51) Int. Cl.
*G06K 9/00*       (2022.01)
*H04N 23/951*    (2023.01)
(Continued)

(52) U.S. Cl.
CPC ........... *H04N 23/951* (2023.01); *G01N 21/88* (2013.01); *G06T 3/4015* (2013.01); *G06T 7/586* (2017.01); *G06T 2207/10024* (2013.01)

(58) Field of Classification Search
CPC .......... G01N 21/88; G01B 11/30; G06T 7/55; G06T 7/586; G06T 3/4053
See application file for complete search history.

(56) References Cited

U.S. PATENT DOCUMENTS

2010/0195168 A1\* 8/2010 Miller .................... H04N 1/193
358/475
2011/0102582 A1\* 5/2011 Graessle ............ G01N 15/1475
348/135
(Continued)

FOREIGN PATENT DOCUMENTS

CN           1837949 A        9/2006

OTHER PUBLICATIONS

International Preliminary Report on Patentability for corresponding PCT/SG2019/050151 filed Mar. 21, 2019; dated Aug. 19, 2019.
(Continued)

*Primary Examiner* — Avinash Yentrapati
(74) *Attorney, Agent, or Firm* — CANTOR COLBURN LLP

(57) ABSTRACT

The present invention includes a system and method for obtaining high-resolution images of objects such as electrical components. The system includes a monochrome camera and three light sources of different wavelengths (e.g. a red light source, a blue light source and a green light source). The camera successively captures a red light image, a blue light image and a green light image of the object. A processor combines the red light image, the blue light image and the green light image into a single high-resolution true color image. Because each image is obtained from an independent light source, the resolution is not limited by the Bayer (RGB) color model. The system is well suited for materials composed of different materials that may react differently to light sources based on its wavelength.

7 Claims, 5 Drawing Sheets

(51) Int. Cl.
*G06T 7/586* (2017.01)
*G01N 21/88* (2006.01)
*G06T 3/40* (2006.01)

(56) References Cited

U.S. PATENT DOCUMENTS

2013/0271596 A1* 10/2013 Lewis ................ G01N 21/9501
 348/126
2018/0013987 A1 1/2018 Malik
2020/0402210 A1* 12/2020 Talbert ................... G06T 5/005

OTHER PUBLICATIONS

International Search Report for corresponding PCT/SG2019/050151 filed Mar. 21, 2019; dated Jun. 17, 2019.
Response to the Written Opinion drawn by the Intellectual Property Office of Singapore dated Jun. 17, 2019.
Written Opinion of the International Searching Authority for corresponding PCT/SG2019/050151 filed Mar. 21, 2019; dated Jun. 17, 2019.

* cited by examiner

METHOD OF COLOR INSPECTION BY USING MONOCHROME IMAGING WITH MULTIPLE WAVELENGTHS OF LIGHT

TECHNICAL FIELD

The invention includes a system and method for imaging, and more specifically, to a system and method of producing a high-resolution image across a wide field of view (FOV) utilizing multiple images obtained from a monochrome camera and with multiple wavelengths of light.

BACKGROUND

Various applications require high-resolution imaging across a wide field of view (FOV). In high-precision manufacturing, objects are inspected to ensure the absence of flaws or irregularities. High-resolution imaging can be essential as the inspection involves examining small but critical features on each component. For example, Automated Optical Inspection (AOI) systems are often used to analyze and evaluate electrical circuits, including flat panel displays, integrated circuits, chip carriers and printed circuit boards.

Conventional imaging methods use a color camera and white light to photograph an object. This process is limited by the hardware used to process the image. A large space-bandwidth product requires using higher magnification and larger lenses. The image sensors are also made larger with higher pixel counts. In the alternative, image sensors with a smaller pixel pitch can be used while maintaining a large active area. However, larger components can be expensive and make the system bulky and cumbersome. Moreover, such systems can be slow and impractical for industrial uses.

A need, therefore, exists for a system and method to overcome the shortcomings of conventional high-resolution imaging systems. Specifically, there is a need for an improved system and method for obtaining high-resolution images of the surfaces of objects for inspection. The system should provide high resolution images and be capable of detecting flaws or irregularities on substrates that are composed of different materials.

SUMMARY OF THE INVENTION

The following summary is provided to facilitate an understanding of some of the innovative features unique to the disclosed embodiment and is not intended to be a full description. A full appreciation of the various aspects of the embodiments disclosed herein can be gained by taking into consideration the entire specification, claims, drawings, and abstract as a whole.

Embodiments of the invention include a system for obtaining a high-resolution image of an object comprising (a) a monochrome camera, (b) a processing unit, (c) a red light source, (d) a blue light source and (e) a green light source. The monochrome camera can capture a red light image, a blue light image and a green light image of the object. The processor can combine the red light image, the blue light image and the green light image into a single high-resolution image.

The surface of the object can be comprised of more than one type of material (e.g. an integrated circuit (IC) package). The processor can convert the red light image, the blue light image and the green light image from RGB to HSI. The processor can also adjust the white balance of each of the red light image, the blue light image and/or the green light image.

Embodiments also include a method of obtaining a high-resolution image of an object, comprising steps of (a) illuminating an object with a red light source, (b) capturing a red light image of the object, (c) illuminating the object with a blue light source, (d) capturing a blue light image of the object, (e) illuminating the object with a green light source, (f) capturing a green light image of the object, (g) combining the red light image, the blue light image and the green light image into a high-resolution image and (h) analyzing the high-resolution image for defects. The method can include a step of adjusting white balance, conversion from RGB to HSI and/or detecting irregularities and/or surface flaws on the object.

Introduction

A first aspect of the invention is a system and method of obtaining high-resolution images of an object for inspection and/or identification of surface defects.

A second aspect of the invention is a system and method of obtaining high resolution images of an object using multiple light sources of different wavelengths.

A third aspect of the invention is a method of combining two or more images taken with different wavelengths of light into a single high-resolution image.

A fourth aspect of the invention is a method of obtaining a high-resolution image of an object without limitations of the Bayer filter.

A fifth aspect of the invention is a method of inspecting features on small objects greater speed and higher sensitivity than conventional approaches.

Definitions

The term "bayer filter" or "bayer image" refers to a color filter array (CFA) for arranging RGB color filters on a square grid of photo sensors. Its particular arrangement of color filters is common in single-chip digital image sensors used in digital cameras, camcorders, and scanners to create a color image. The filter pattern is 50% green, 25% red and 25% blue, hence is also referred to as BGGR, RGBG, GRGB or RGGB.

The term "color model" refers to a way to define color on a computer screen or paper. Common color models include RGB (red, green, blue) and CMYK (cyan, magenta, yellow, black), HSI cone and CIELAB.

The term "diffuse reflection" refers to the reflection of light or other waves or particles from a surface such that a ray incident on the surface is scattered at many angles rather than at just one angle as in the case of specular reflection. An ideal diffuse reflecting surface is said to exhibit Lambertian reflection, meaning that there is equal luminance when viewed from all directions lying in the half-space adjacent to the surface.

The term "filter" in the field of optics and photography refers to a device that selectively transmits light of different wavelengths, usually implemented as plane glass or plastic devices in the optical path which are dyed or have interference coatings.

The term "HSI color space" refers to a model for image processing applications that represents colors similar to how the human eye senses colors. The HSI color model represents every color with three components: hue (H), saturation (S), intensity (I).

The term "panchromatic" refers to a photograph or image that includes all (visible) wavelengths of light.

The term "Quad Flat Package" or "QFP" refers to a surface mount integrated circuit package with "gull wing" leads extending from each of the four sides.

The term "RGB color model" refers to an additive color model in which red, green and blue light are added together reproduce colors. The name comes from the initials of the three additive primary colors, red, green, and blue. The RGB color model is additive in the sense that the three light beams are added together, and their light spectra add, wavelength for wavelength, to make the final color's spectrum.

The term "semiconductor chip," as used herein, refers to an integrated circuit or monolithic integrated circuit (also referred to as an IC, a chip, or a microchip) which is a set of electronic circuits on one small plate ("chip") of semiconductor material, normally silicon.

The term "Thin Small Outline Package" or "TSOP" refers to a type of surface mount Integrated Circuit (IC) package. They typically have leads on two sides and are often used for RAM or Flash memory ICs due to their high pin count and small volume.

The term "white balance" refers to the process of removing unrealistic color casts, so that objects which appear white in person are rendered white in your photo.

BRIEF DESCRIPTION OF THE FIGURES

The drawings described herein are for illustrative purposes only of selected embodiments and not all possible implementations, and are not intended to limit the scope of the disclosure.

DETAILED DESCRIPTION OF THE INVENTION

An objective of the invention is a system and method of producing high-definition images of small objects with higher sensitivity than conventional approaches. Further, by using different wavelengths of light, different kinds of materials can be visualized and inspected.

Figure 1A:
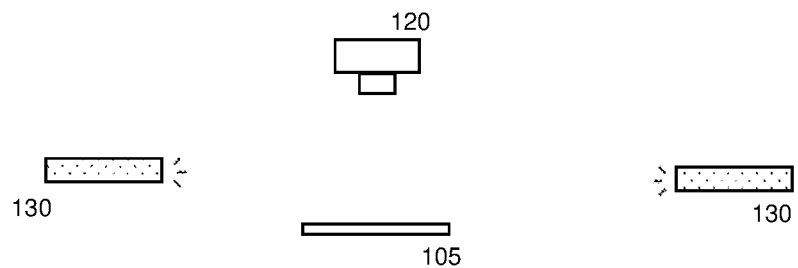
FIG. 1A depicts an arrangement of components of a conventional system for obtaining images of an object.

FIG. 1A depicts a conventional system for recording an image of an object such as an electronic component. An object 105 is placed in a field of view (FOV). One or more sources 130 of light illuminate the object. Typically, the light sources are white lights. Reflected light is detected with a sensor such as a camera 120.

In conventional lens-based imaging systems, a large space-bandwidth object requires higher magnification and larger lenses. The image sensors are also made larger with higher pixel counts. In the alternative, image sensors with a smaller pixel pitch can be used while maintaining a large active area. However, larger components can be expensive and make the system bulky and cumbersome. Moreover, such systems can be slow and impractical for industrial uses. Further, there are often misalignment problems associated with conventional methods that combine separate images.

Another limitation is the use of "RGB color model" technology. To form a color using RGB, three beams of light are superimposed. The RGB color model is additive in the sense that the three light beams are added together to make the final color's spectrum.

Figure 1B:
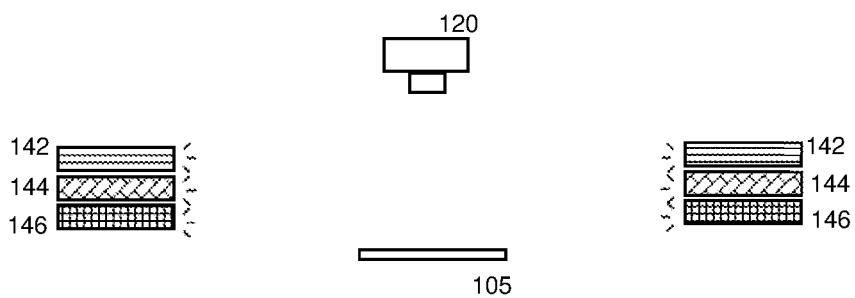
FIG. 1B depicts an arrangement of components of a system for obtaining high-resolution images of objects using multiple light sources, according to one aspect of the invention.

FIG. 1B depicts a system for recording a high-resolution image of an object according to one aspect of the invention. An object 105 is placed in the field of view (FOV). One or more sources of light (142, 144, 146) illuminate the object (105). The light sources include multiple wavelengths of light. Separate light sources are used (e.g. red, green and blue). For example, a first (red) light source 142 has a wavelength 690 nm. A second (green) light source 144 has a wavelength 540 nm and a third (blue) light source 146 has a wavelength 470 nm.

Producing a High-Resolution True Color Image

Reflected light is detected with a sensor such as a camera 120. Here, a monochrome (i.e. black and white) camera and colored light is used to produce a high resolution image of an object. An image is taken as each light source flashes onto an object (i.e. three instances). Three images are obtained in grey-scale but the source of light for each image is one of red, green or blue. The images can then be combined into a single high-resolution image. Although the image is monochrome, it is described herein as a "high resolution true color image" because the source of the image is red, green and blue light.

Figure 2A:
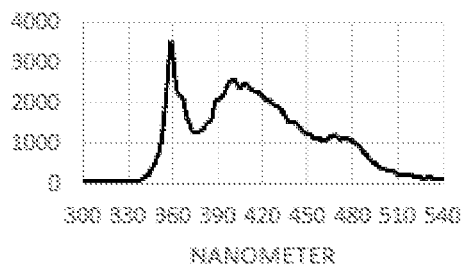
FIG. 2A depicts the wavelength of white light as used in conventional approaches to imaging.
Figure 2B:
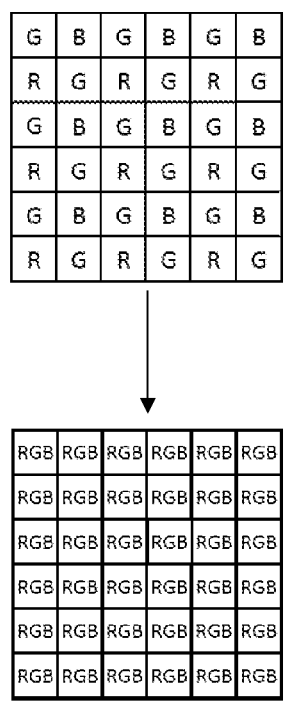
FIG. 2B depicts the interpolation method of the RBG color model.

FIG. 2A and FIG. 2B show some limitations of the RGB color model. FIG. 2A depicts the wavelength of white light. The wavelength spans a broad range, 330 nm to 510 nm. Conventional approaches of digital imaging typically rely on this model which can be adequate for routine viewing and other visual purposes. Color pixels are calculated using an interpolation method as depicted in FIG. 2B. The RGB color model is additive in the sense that the three light beams are added together to make the final color's spectrum. The final color image is obtained by Bayer estimation formula stored in 24 bits of data per pixel. When considering that digital images are characterized as "RGB," each pixel is either an R, G or B. The pixel will appear as a single color when viewed due to spatial integration by the human eye. This inherently limits the resolution of the image as half of the image resolution is dedicated to accurate measurement of the green color channel and quarter of the image resolution of the red or blue color channel.

Figure 3A:
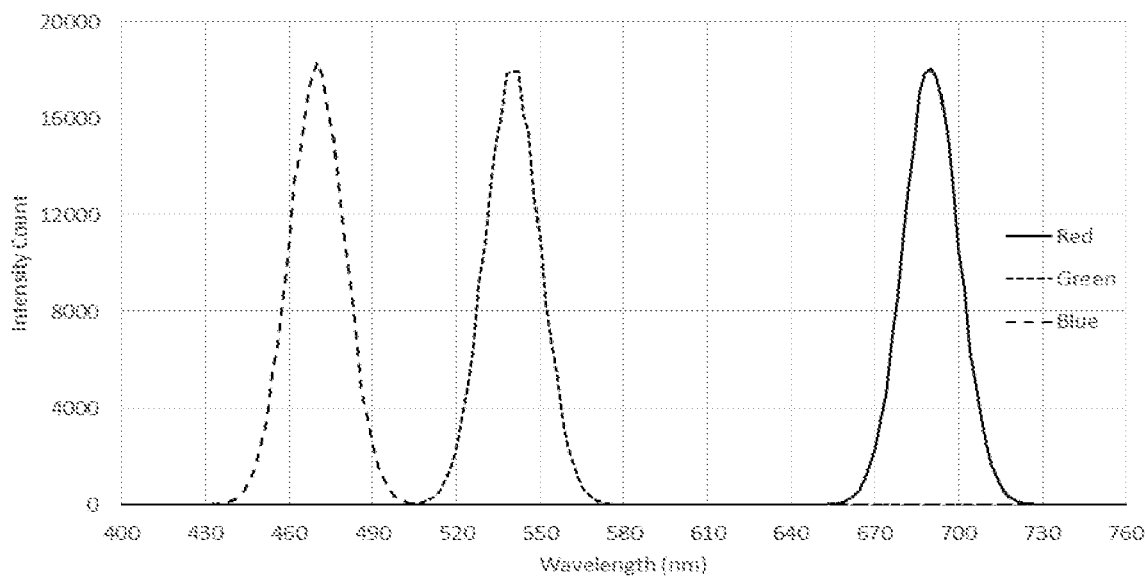
FIG. 3A depicts the wavelengths of three lights sources used in true color imaging according to one aspect of the invention.
Figure 3B:
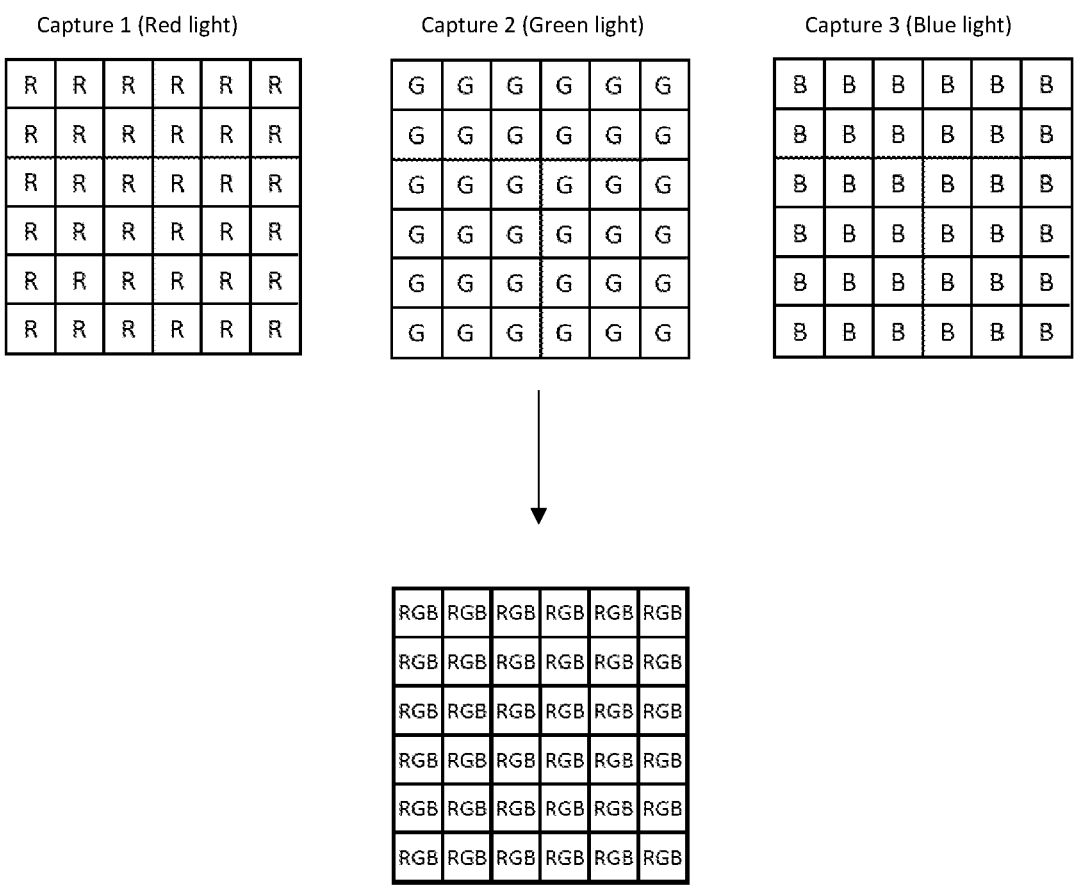
FIG. 3B depicts the process of combining three images, each obtained from a single wavelength of light, according to one aspect of the invention.

FIG. 3A and FIG. 3B depict the process of producing a high resolution true color image according to one embodiment of the invention. FIG. 3A depicts the wavelengths of three light sources (i.e. red, green and blue). Unlike white light, each colored light source has a distinct, narrow wavelength. The light sources include multiple wavelengths of light. FIG. 3B depicts three separate images, whereby each uses one of the light sources. Each image (i.e. capture) can then be combined to produce the final image. The color pixels are calculated using full detail of color information. The final image uses true color information stored in 24 bits of data per pixel. It can be referred to as a "high-resolution true color image" although it is monochrome.

In comparing a Bayer image with a high-resolution true color image, edges in the latter will generally appear sharper. The edges in the high-resolution true color image present the three colors more accurately. Whereas, in the Bayer image, the edges can suffer from color artifacts due to the interpolation of Bayer's kernel filter. Not every pixel will have information on all three colors.

Imaging Objects of Mixed Materials

While a benefit of the invention is higher resolution, it also allows for the use of different wavelengths of light for imaging different kinds of materials. The materials that are imaged may not have the same characteristics for all wavelengths of light. For example, a Ball Grid Array (BGA) usually has both metal and plastic components. Imaging a BGA with a single wavelength of light can lead to a poor quality image as the components can react differently to wavelengths of light. When using a single light source, different materials can be indistinguishable. Images recorded using different wavelengths of light can be compared or combined. However, using multiple scans with different wavelengths of light can increases the time needed to complete the scan and introduce errors due to mechanical offset between scans. The approach described herein overcomes this limitation.

Figure 4:
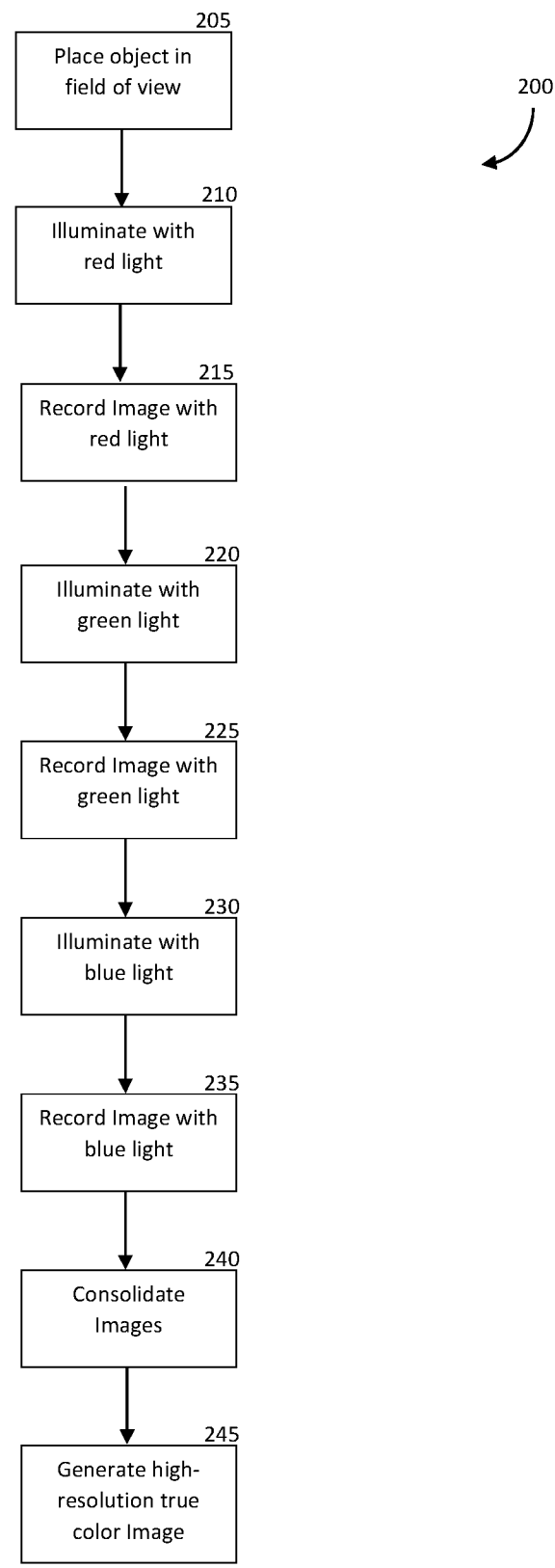
FIG. 4 is a flow chart that describes a process for obtaining high-resolution images of an object using multiple light sources of different wavelengths, according to one aspect of the invention.

FIG. 4 is a flowchart 200 that lists the steps in a preferred method of creating a high resolution true color image of an object. First, the object is placed in the field of view of the camera 205. The object is illuminated with a red light source 210 and an image is recorded 215. The object is then illuminated with a green light source 220 and the image is recorded 225. The object is illuminated with a blue light source 230 and the image is recorded 235. The images are then consolidated 240. A single high-resolution true color image is generated 245.

Figure 5:
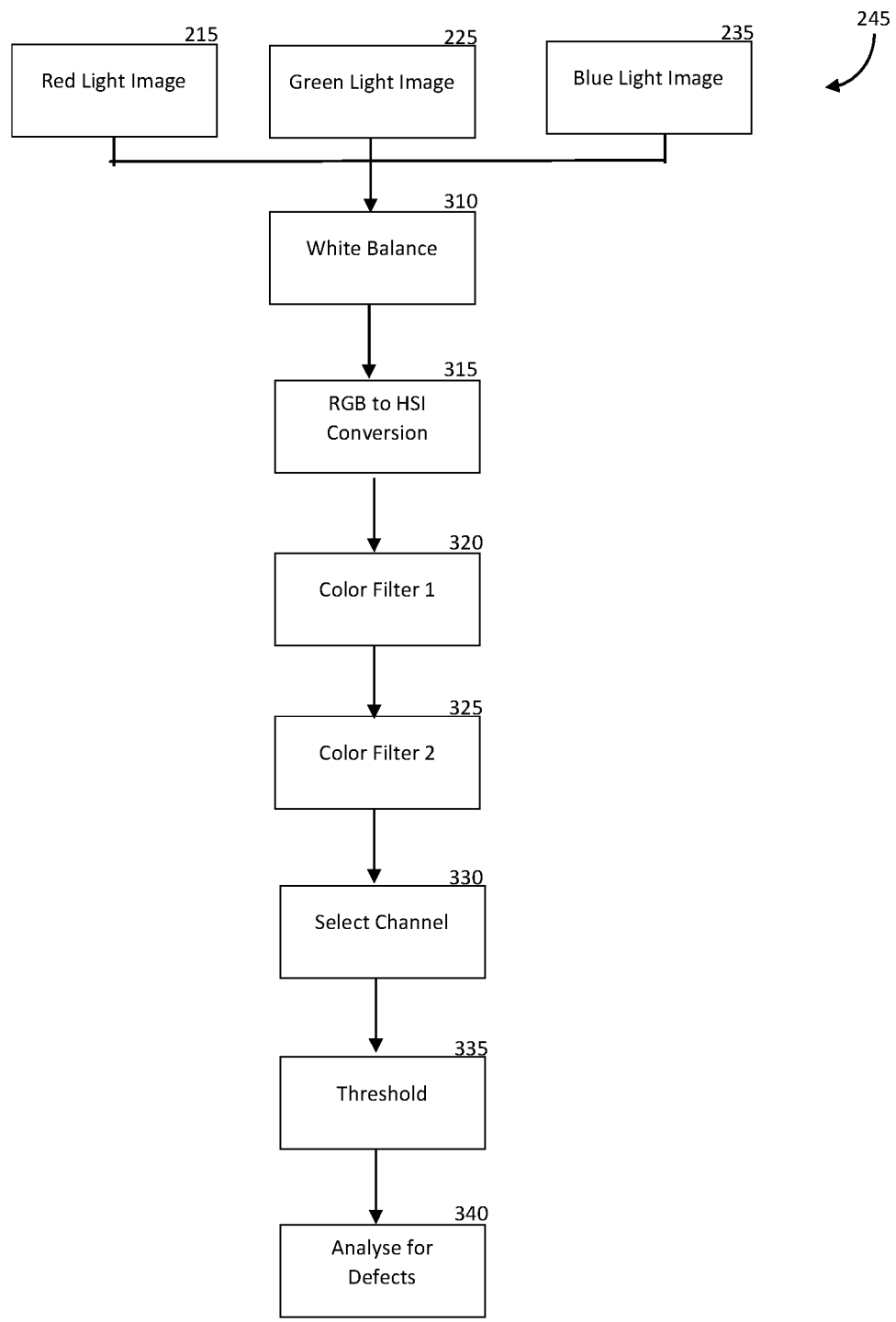
FIG. 5 is a flow chart that describes a process for consolidating high resolution images to produce a single high-resolution true color image, according to one aspect of the invention.

FIG. 5 is a flowchart 200 that lists the steps in a preferred method of consolidating the images to produce a single high-resolution true color image. First, the images are recorded (215, 225, 235). Next, white balance is used to remove color casts 310. The images are then converted from RGB to HSI 315. A first color filter 320 and a second color filter 325 are applied. A channel can then be selected 330 followed by a threshold 335. The image can then be used to analyze the object for defects 340.

The system can include a computer with software loaded thereon or executable by the computer to process raw images that are output from the sensor output of the image sensor. Images can be transferred to the computer using a conventional cable or wirelessly transmitted to the computer. The software can include the reconstruction algorithm described herein which may be embodied in MATLAB® or other program (e.g., C language). The software is executed by one or more processors contained in the computer. To improve performance, the computer can include a processor that is part of a graphics processing unit (GPU) to speed the image reconstruction process. The computer can include a personal computer, server, laptop or the like. The computer can also be coupled to or otherwise contain a monitor and one or more peripheral devices (e.g., mouse, keyboard, or the like). Images can be displayed to the user on the monitor.

Working Example

High Resolution Imaging and Inspection of a TSOP

A Thin Small Outline Package or "TSOP" is a type of surface mount Integrated Circuit (IC) package. High resolution true color imaging can be used to inspect the surface of a TSOP for irregularities or defects. In this example, an image is obtained for inspection.

The TSOP is approximately 8×13 mm with a defect size (Copper) of approximately 30×100 µm. The TSOP is illuminated with a RGB Dome and Co-axial light source. The 25 Megapixel digital camera is used with a fixed lens.

Three images are recorded in short succession. A first image is recorded using a first wavelength of light (e.g. red at 690 nm). A second image is recorded using a second wavelength of light (e.g. green at 540 nm). A third image is recorded using a third wavelength of light (e.g. blue at 470 nm).

The following results are obtained. The resolution is 10 µm/pixel with a Field of View (FOV) of 50×50 mm.

The system is well suited to variations of reflectivity on the surface of a substrate. It also has the benefit of spectral scanning as different materials can react differently to different wavelengths of light. The smallest defect than can be detected should not be smaller than 30 µm.

The system allows one to analyse variations of the materials (rather than just the shape). For example, a chip can have a thin layer of metal on the surface. This approach allows one to detect flaws/imperfections that may not exhibit signals (information) with conventional light imaging methods. Wavelength-dependent transmission, absorption or scattering features of the object can enhance the signal (information) of the image and reveal chemical and/or physical properties.

It will be appreciated that variations of the above disclosed and other features and functions, or alternatives thereof, may be combined into other systems or applications. Also, various unforeseen or unanticipated alternatives, modifications, variations or improvements therein may be subsequently made by those skilled in the art which are also intended to be encompassed by the following claims.

Although embodiments of the current disclosure have been described comprehensively, in considerable detail to cover the possible aspects, those skilled in the art would recognize that other versions of the disclosure are also possible.

What is claimed is:

1. A system for obtaining a high-resolution image of an object, comprising:
   a) a red light source;
   b) a blue light source;
   c) a green light source;
   d) a monochrome camera; and
   e) a processing unit;
   wherein the monochrome camera captures a red light image of the object, a blue light image of the object and a green light image of the object;
   wherein the processor adjusts the white balance of the red light image, the blue light image and the green light image, wherein the white balance is used to remove color casts;
   wherein the processor converts the red light image, the blue light image and the green light image from RGB to HSI;
   wherein the processor combines the red light image, the blue light image and the green light image into a single high-resolution image, wherein each light source has a distinct wavelength; and wherein a first color filter and a second color filter are applied and a channel is selected to obtain the single high-resolution image.

2. The system of claim 1, wherein the surface of the object is comprised of more than one type of material.

3. The system of claim 1, wherein the object is a wafer or an integrated circuit (IC) package.

4. A method of obtaining a high-resolution image of an object for inspection of defects, comprising steps of:
   a) illuminating the object with a red light source;
   b) capturing a red light image of the object with a camera;
   c) illuminating the object with a blue light source;
   d) capturing a blue light image of the object with the camera;
   e) illuminating the object with a green light source;
   f) capturing a green light image of the object with the camera;
   g) adjusting the white balance of the red light image, the blue light image and the green light image, wherein white balance is used to remove color casts;
   h) converting the red light image, the blue light image and the green light image from RGB to HSI;
   i) combining the red light image, the blue light image and the green light image into a high-resolution image by applying a first color filter and a second color filter, and selecting a channel, wherein each light source has a distinct wavelength; and
   j) analysing the high-resolution image for defects.

5. The method of claim 4, wherein the surface of the object is comprised of more than one material.

6. The method of claim 4, wherein the object is a wafer or an integrated circuit (IC) package.

7. The method of claim 4, wherein the defects are irregularities and/or surface flaws on the object.

* * * * *